(12) United States Patent
John et al.

(10) Patent No.: US 9,475,707 B2
(45) Date of Patent: Oct. 25, 2016

(54) SYSTEM FOR EXTRACTING WATER FROM AIR FOR DRINKING AND CLEANING PURPOSES AND A METHOD THEREOF

(75) Inventors: Jim Joseph John, Maharashtra (IN); Mehul C. Raval, Mumbai (IN); Chetan Singh Solanki, Mumbai (IN); Anil Kottantharayil, Kerala (IN)

(73) Assignee: INDIAN INSTITUTE OF TECHNOLOGY, BOMBAY, Mumbai (IN)

( * ) Notice: Subject to any disclaimer, the term of this patent is extended or adjusted under 35 U.S.C. 154(b) by 284 days.

(21) Appl. No.: 14/241,279

(22) PCT Filed: Oct. 10, 2011

(86) PCT No.: PCT/IN2011/000701
§ 371 (c)(1),
(2), (4) Date: Mar. 4, 2014

(87) PCT Pub. No.: WO2013/030844
PCT Pub. Date: Mar. 7, 2013

(65) Prior Publication Data
US 2015/0053249 A1    Feb. 26, 2015

(30) Foreign Application Priority Data
Aug. 26, 2011   (IN) .......................... 2408/MUM/2011

(51) Int. Cl.
  *C02F 1/04*   (2006.01)
  *C02F 1/14*   (2006.01)
  (Continued)

(52) U.S. Cl.
  CPC ............. *C02F 1/043* (2013.01); *B01D 1/0035* (2013.01); *B01D 1/0064* (2013.01); *B01D 1/30* (2013.01); *B01D 5/0018* (2013.01); *B01D 5/0066* (2013.01); *B01D 53/261* (2013.01); *B01D 53/28* (2013.01); *E03B 3/28* (2013.01);
  (Continued)

(58) Field of Classification Search
CPC ............. E03B 3/28; B01D 1/30; B01D 5/00; B01D 5/009; B01D 5/0015; B01D 5/0018; B01D 5/0066; B01D 53/04; B01D 53/26; B01D 53/261; C02F 1/043; C02F 1/14; C02F 2103/18; H02S 40/10; F24J 2/461; Y02E 10/40
See application file for complete search history.

(56) References Cited

U.S. PATENT DOCUMENTS 3,400,515 A * 9/1968 Ackerman ............... C02F 1/045
                                                                    96/118
5,846,296 A * 12/1998 Krumsvik ............ B01D 5/0066
                                                                    95/115

FOREIGN PATENT DOCUMENTS

| CN | 101496703 A | 8/2009 |
|---|---|---|
| DE | 10107981 A1 | 8/2002 |
| EP | 0947470 A1 | 10/1999 |

*Primary Examiner* — Saeed T Chaudhry
(74) *Attorney, Agent, or Firm* — Rahman LLC

(57) ABSTRACT

A system for extraction of water from air includes a salt plate, a moisture absorption unit and a filter unit. The system further includes a storage unit. A method for extraction of water using the system includes placing the salt plate beneath the moisture absorption unit during a moisture absorption phase and placing the salt plate beneath the filter unit during a water extraction phase. The extracted water is stored in the storage unit for drinking and cleaning purposes. Further, a system for cleaning solar panels includes a moisture absorbing unit, a filter unit, a salt plate, a water storage unit, a solar panel, a wiper mechanism to receive water from the storage unit to clean the solar panel, and support elements to moveably support wiper mechanism.

13 Claims, 8 Drawing Sheets

(51) Int. Cl.
*E03B 3/28* (2006.01)
*F24J 2/46* (2006.01)
*B01D 1/00* (2006.01)
*B01D 1/30* (2006.01)
*B01D 5/00* (2006.01)
*H02S 40/10* (2014.01)
*B01D 53/26* (2006.01)
*B01D 53/28* (2006.01)

(52) U.S. Cl.
CPC ............... *F24J 2/461* (2013.01); *H02S 40/10* (2014.12); *B01D 2253/112* (2013.01); *C02F 2303/18* (2013.01); *C02F 2307/10* (2013.01); *Y02E 10/40* (2013.01)

SYSTEM FOR EXTRACTING WATER FROM AIR FOR DRINKING AND CLEANING PURPOSES AND A METHOD THEREOF

FIELD OF INVENTION

This invention relates to a device for extracting water from air, and more particularly to a device for extraction of water for drinking and cleaning purposes.

BACKGROUND OF INVENTION

Water plays a very important role in human lives and is required for various activities, amongst which the most important is for drinking. The availability of water is a global problem. Rivers, lakes, bore wells, etc. act as the traditional source of water. However, these traditional sources are not available everywhere such as in arid and semi-arid regions, where the sources of water are either absent or very limited.

Generally, methods used for extracting water require traditional sources of water and each method has inherent weaknesses and disadvantages. It is therefore important to explore alternative sources of water to cater to situations where traditional sources of water are not readily available. Conversion of moisture into water is emerging as a good source for water generation. Hence, there is a need for converting moisture into water, using a system which is easy to design and economical to implement.

Further, in general, locations which are considered to be viable for placement of solar panels for generation of energy are usually those places where the water is scarce. The solar panels in such places suffer from loss of energy generation due to accumulation of dust, animal excreta and other obstructions which significantly affects the working of the solar panels. Other than energy loss, there could be a system-level failure due to hot spots generated in unclean systems. Hence, there is a need for cleaning of the systems at regular intervals of time to ensure optimum functioning of the systems.

OBJECT OF INVENTION

The principal object of this invention is to provide a method and device for extracting water from air.

Another object of the invention is to provide a method and device for extracting water from air for drinking purposes.

A further object of the invention is to provide a method and device for extracting water from air for cleaning of solar panels.

BRIEF DESCRIPTION OF FIGURES

This invention is illustrated in the accompanying drawings, throughout which like reference letters indicate corresponding parts in the various figures. The embodiments herein will be better understood from the following description with reference to the drawings, in which.

DETAILED DESCRIPTION OF INVENTION

The embodiments herein and the various features and advantageous details thereof are explained more fully with reference to the non-limiting embodiments that are illustrated in the accompanying drawings and detailed in the following description. Descriptions of well-known components and processing techniques are omitted so as to not unnecessarily obscure the embodiments herein. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

The embodiments herein achieve the extraction of water from air which may further be used for drinking or cleaning purposes.

Figure 1:
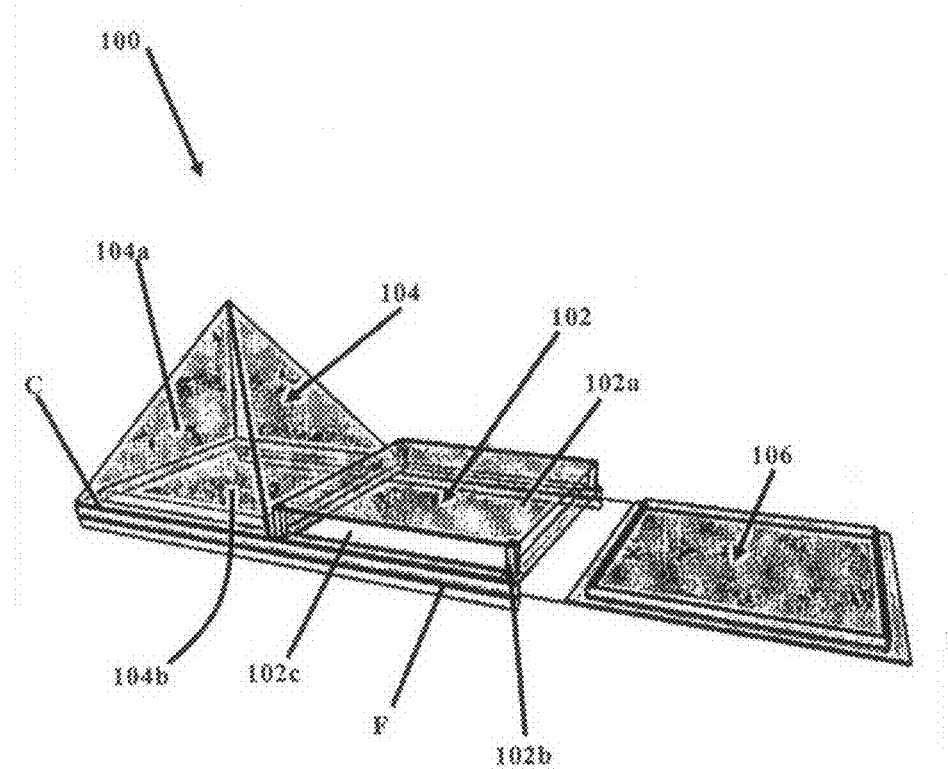
FIG. 1 depicts/illustrates a system for extracting water from air, according to embodiments as disclosed herein.

Referring now to the drawings, and more particularly to FIG. 1, where similar reference characters denote corresponding features consistently throughout the figures, there are shown preferred embodiments.

FIG. 1 depicts a system 100 for extracting water from the moisture content present in air. The system 100 includes a moisture absorbing unit 102, a filter unit 104, a salt plate 106, a frame F and a water channel C.

According to one embodiment, the moisture absorbing unit 102 has a covering 102a configured to be placed above the salt plate 106. The covering 102a further has a plurality of supports 102b to engage the covering 102a with the frame F. The covering 102a along with the supports 102b defines a plurality of openings 102c to facilitate water absorption by the salt placed in the salt plate 106. During moisture absorption phase, the salt plate 106 is slid directly below the covering 102a. The covering 102a provides protection of salt placed in the salt plate 106 against outside contaminants. The covering 102a is made of a material having low thermal conductivity and high reflectivity to minimize heating of the salt solution. Suitable materials without limitation include fiber glass, wood painted white. It is also within the scope of the invention that the covering 102a be made of any other material apart from the aforementioned materials without otherwise deterring the intended function of the system 100 and the moisture absorbing unit 102.

Further, it should also be noted that in certain embodiments, the covering 102a may be removed.

Figure 2:
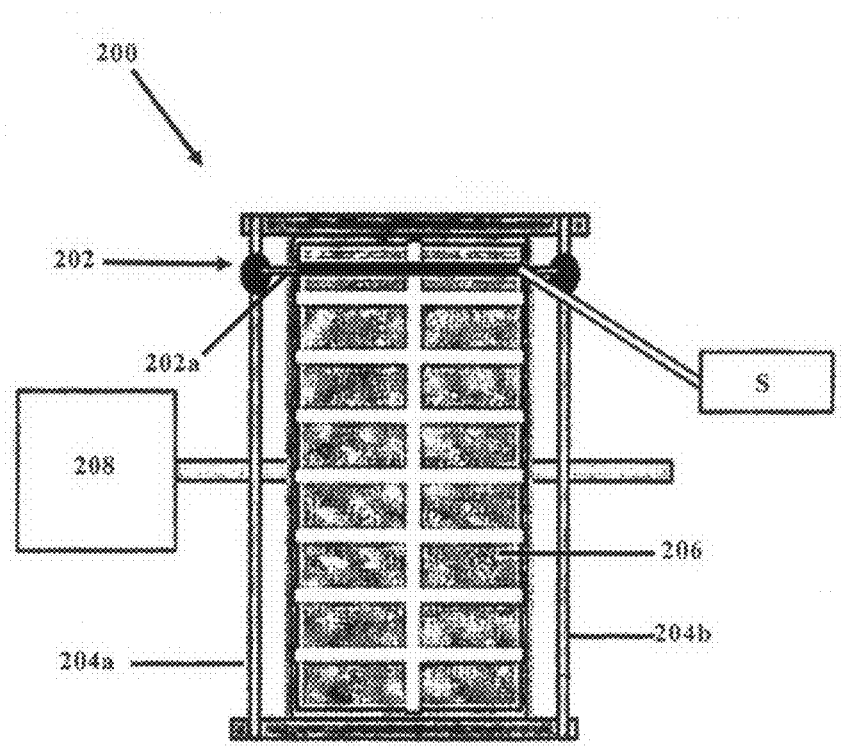
FIG. 2 depicts/illustrates a solar panel cleaning system, according to embodiments as disclosed herein.

The filter unit 104 includes a top covering 104a with a hollow base 104b. The base 104b includes a water channel C at an interior portion thereof. The water channel C has a least one opening (not shown) to allow for a flow of water to a storage unit S (as shown in FIG. 2.). The rest of the base 104b is hollow. During water extraction phase, the salt plate 106 is slid directly below the hollow base 104b such that the salt plate 106 is in fluid communication with the top covering 104a of the filter unit 104. The salt plate 106 along with the water channel C provides a sealing enclosure to reduce loss of water from the salt plate 106. In one embodiment, the covering 104a provided in the filter unit 104 defines a pyramid shape. In another embodiment, the covering provided in the filter unit 104 defines a pyramid, conical or dome shape. It is also within the scope of the invention that the filter unit 104 is of a shape other than pyramid, dome and conical without otherwise deterring the intended function of the system 100. The filter unit 104 is configured to extract of the water absorbed by the salt provided in the salt plate 106.

The salt plate 106 contains salt which will be used for absorbing water from air. The salt plate 106 has a surface defining a boundary and configured to receive salt therein. In one embodiment, a shape of the salt plate 106 corresponds with a shape of the base 104b to ensure a good fit between the base 104b of the covering 104a and the salt plate 106. In one embodiment, the salt plate 106 is square in shape. In another embodiment, the salt plate 106 is circular in shape.

In one embodiment, the top covering 102a of the moisture absorbing unit 102 is engaged to the frame F via each of the supports 102b. Further, the covering 104a of the filter unit 104 is engaged with the frame F about the base 104b thereof. The salt plate 106 is slid below the moisture absorbing unit 102 or the filter unit 104. In another embodiment, the top covering 102a of the moisture absorbing unit 102 and the covering 104a of the filter unit 104 are engaged with the frame F in a sliding arrangement. The moisture absorbing unit 102 and filter unit 104 are placed on a set of grooves (not shown) provided in the frame F. The salt plate 106 is placed on another set of grooves (not shown) provided in the frame F and slid to a position to allow for moisture absorption or moisture extraction. Any other means of attachment of the moisture absorbing unit 102, filter unit 104 and salt plate 106 known to a person skilled in the art to accomplish the activity of moisture absorption or moisture extraction as disclosed herein is also within the scope of this disclosure.

Method of Operation

In one embodiment, method of extraction of water from air is performed in two phases. The first phase or the moisture absorbing phase incorporates the sliding of the salt plate 106 beneath the covering 102a of the moisture absorbing unit 102. The salt provided in the salt plate 106 in the presence of ambient conditions starts absorbing water from air. The moisture absorbing phase is continued for a first predetermined duration to provide for maximum absorption of water by the salt. The predetermined duration is dependant on the geographical conditions in which the system 100 is operated. In one embodiment, the first predetermined duration is preferably from evening to morning, ranging from 8 to 12 hours to allow for maximum water absorption.

After the salt plate 106 has been placed beneath the covering 102a of the moisture absorbing unit 102 for the first predetermined duration, the salt plate is slid and fitted beneath the covering 104a of the filter unit 104 to undergo the second phase or the water extracting phase. The water absorbed by the salt in the salt plate 106 is then allowed to evaporate for a second predetermined duration to provide for maximum evaporation. The predetermined duration is dependant on the geographical conditions in which the system 100 is operated. In one embodiment, the second predetermined duration is preferably from morning to evenings, ranging from 10 to 12 hours to allow for maximum water extraction. The evaporated water condenses on the walls of the covering 104a and flows into the water channel C. The channel C contains at least one or more openings (not shown) which flows the collected water into the storage unit S. In another embodiment, the openings provide a filter to filter the water before it is collected in the storage unit S. After the water evaporation phase is complete, the salt plate initially containing the salt with absorbed water will now contain either no or very less amount of absorbed water.

After the salt plate 106 has been placed beneath the covering 104a of the filter unit 104 for the second predetermined duration, the salt plate 106 is slid back beneath the covering 102a of the moisture absorbing unit 102 to again restart the moisture absorption from air and water evaporation phase for water extraction.

Water for Drinking Purposes

The water from the system 100 was collected in the storage unit S. The water was found to be fit for drinking purposes. In one embodiment, the water collected in the storage unit S is further treated with ultra violet radiation to eliminate harmful microorganisms.

The details of the invention provided in the following example is given by way of illustration only and should not be construed to limit the scope of the present invention.

EXAMPLE 1

The water from the system 100 was collected in the storage unit S. The collected water was measured for pH, Nitrate, Chloride, TDS, Salinity and Conductivity criteria. The water collected in the storage unit S satisfied the limits provided by BIS/WHO and also fell within the potability range as provided in Table 1. The water was found to be fit for drinking purposes.

TABLE 1

| Parameter | Measured Values | Potability Range | BIS/WHO Standards |
|---|---|---|---|
| pH | 8.2 | 6.5-8.5 | 6.5-8.5 |
| Nitrate | 23 ppm | <45 ppm | 0-45 ppm |
| Chloride | 7 ppm | <250 ppm | 0-250 ppm |
| TDS | <128 ppm | <500 pppm | 0-500 ppm |
| Salinity | 11 ppm | <410 ppm | 990 ppm |
| Conductivity | <200 uSiemens | <780 uSiemens | 2500 uSiemens |

Water for Cleaning Purposes

The water collected in the storage unit S is also useful for cleaning purposes. The water stored in the storage unit S is used for cleaning solar panels.

FIG. 2 depicts a solar panel cleaning system 200. The solar panel cleaning system 200 includes a solar panel 206, a wiper unit 202, support elements 204a and 204b, and the storage unit S. The solar panel cleaning system 200 may optionally be provided with a sun tracking system 208. The wiper unit 202 includes a hollow tube 202a and a wiper (not shown) projecting from the hollow tube 202a. The wiper may be made of rubber or any material used for wiping purposes.

In an embodiment, the hollow tube with wiper 202 is engaged to support elements 204a and 204b via a ball-screw sliding mechanism. In another embodiment, a lead screw mechanism may be employed to engage the wiper 202 with the support elements 204a and 204b. In one embodiment, the storage unit S is placed higher than the placement of the hollow tube 202a. The flow of water due to gravity from the storage unit S to the hollow tube 202a is controlled by way of a valve mechanism. During the cleaning phase the valve mechanism is electronically or mechanically controlled to allow the flow of water from the storage unit S to the hollow tube 202a. The water then flows through a plurality of apertures (not shown) provided in the hollow tube 202a onto the solar panel 206. The hollow tube 202a is then moved across the surface of the solar panel 206 either electronically or mechanically to clean the solar panel 206 surface.

In another embodiment, the storage unit S is placed lower than the placement of the hollow tube 202a. The flow of water from the storage unit S to the hollow tube 202a is done by using a pump. Other modes of providing the water against gravity known to a person skilled in the art may also be applied.

In a further embodiment, the water from the storage unit S is mixed with surface detergents in a mixing unit (not shown) before flowing through the apertures of the hollow tube 202a.

208 is a sun tracking system which may be optionally used in solar panels. The system of cleaning the solar panel 206 is powered by an external source or energy generated by the solar panels or can be coupled with existing single-axis trackers.

Salts with Water Absorption Properties

The salt plate 106 provides for a salt or mixture thereof having high water absorption capabilities. Selection of appropriate salts was performed after analyzing the critical relative humidity (CRH) of the salts at 25 degree C. The values are provided in Table 2. (Source—Greenspan, Lewis (January-February 1977). Humidity fixed points of binary saturated aqueous solutions. *Journal of research of the national Bureau of Standards—A, Physics and chemistry*; Volume 81A, No. 1; Page 91)

TABLE 2

| Material | CRH (approximate values) |
|---|---|
| Cesium Fluoride | 6.20938 |
| Lithium Bromide | 7.75437 |
| Zinc Bromide | 9.28455 |
| Potassium Hydroxide | 16.7049 |
| Sodium Hydroxide | 11.5581 |
| Lithium Chloride | 11.2323 |
| Calcium Bromide | 23.5670 |
| Lithium Iodide | 22.8216 |
| Potassium Acetate | 22.4388 |
| Potassium Fluoride | 65.7907 |
| Magnesium Chloride | 33.6686 |
| Calcium Chloride | 32.00 |
| Sodium Iodide | 42.6040 |
| Potassium Carbonate | 43.1315 |
| Magnesium Nitrate | 60.3514 |
| Sodium Bromide | 64.7190 |
| Cobalt Chloride | 73.0330 |
| Potassium Iodide | 74.5466 |
| Strontium Chloride | 78.5322 |
| Sodium Nitrate | 79.5738 |
| Sodium Chloride | 75.5164 |
| Ammonium Chloride | 81.8777 |
| Potassium Bromide | 86.6424 |
| Ammonium Sulfate | 81.7794 |
| Potassium Chloride | 88.6190 |
| Strontium Nitrate | 94.2127 |
| Potassium Nitrate | 96.3361 |
| Potassium Sulfate | 98.7792 |
| Potassium Chromate | 103.934 |

Based on the toxicity levels, CRH values and cost of various salts: $MgCl_2$, $CaCl_2$ and combinations of $MgCl_2$ and $CaCl_2$ were selected.

Figure 3:
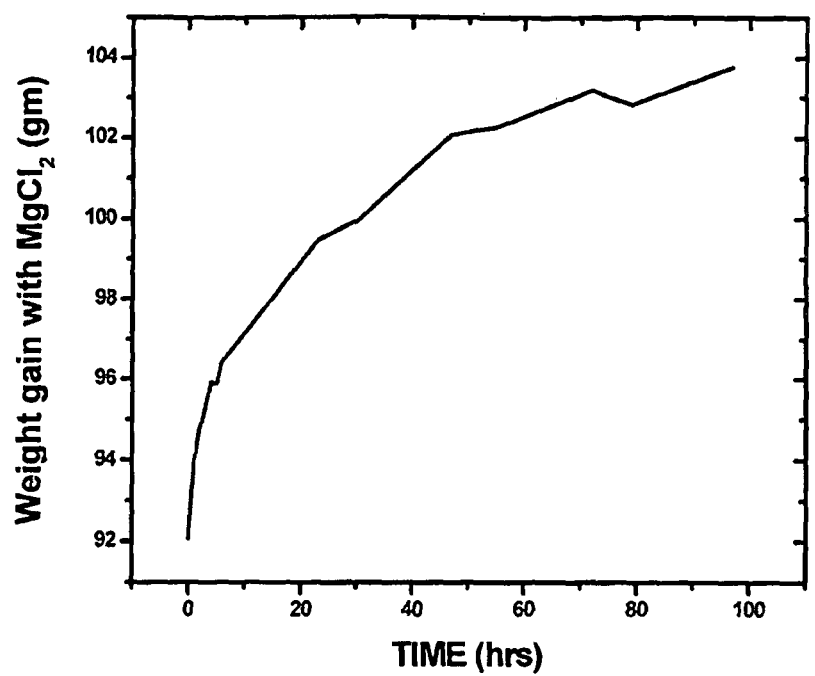
FIG. 3 depicts/illustrates a graph showing weight gain with $MgCl_2$ versus time.

FIG. 3 depicts/illustrates a graph showing weight gain with $MgCl_2$ versus time. Net moisture gained in the period of 100 hrs was found to be 12 gms for 17.27 gms of salt (70%) at a temperature ranging from 27° C. to 34° C. and humidity ranging from 74% to 84%.

Figure 4:
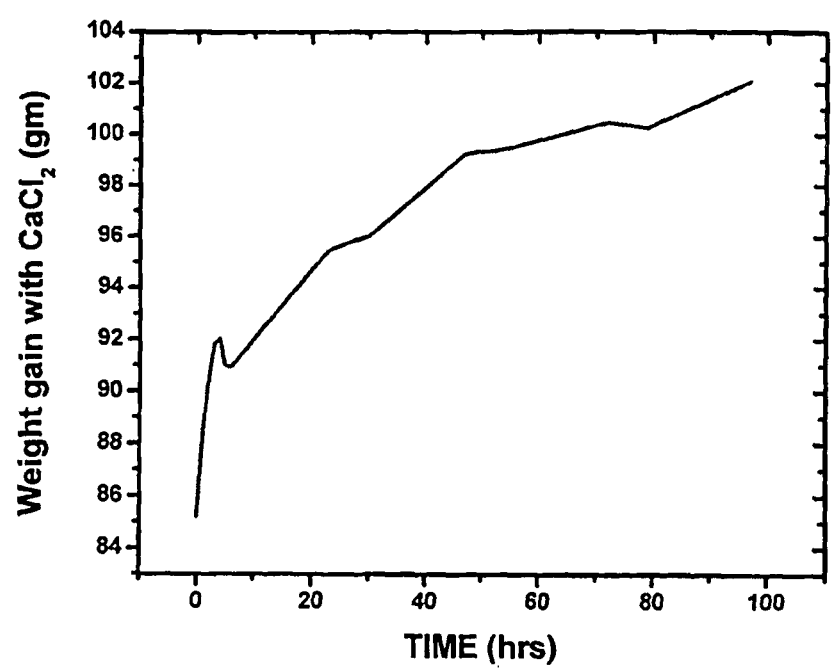
FIG. 4 depicts/illustrates a graph showing weight gain with $CaCl_2$ versus time.

FIG. 4 depicts/illustrates a graph showing weight gain with $CaCl_2$. Net moisture gained in the period of 100 hrs is 18 gms for 7.2 gms of salt (105%) at a temperature ranging from 27° C. to 34° C. and humidity ranging from 74% to 84%.

Figure 5:
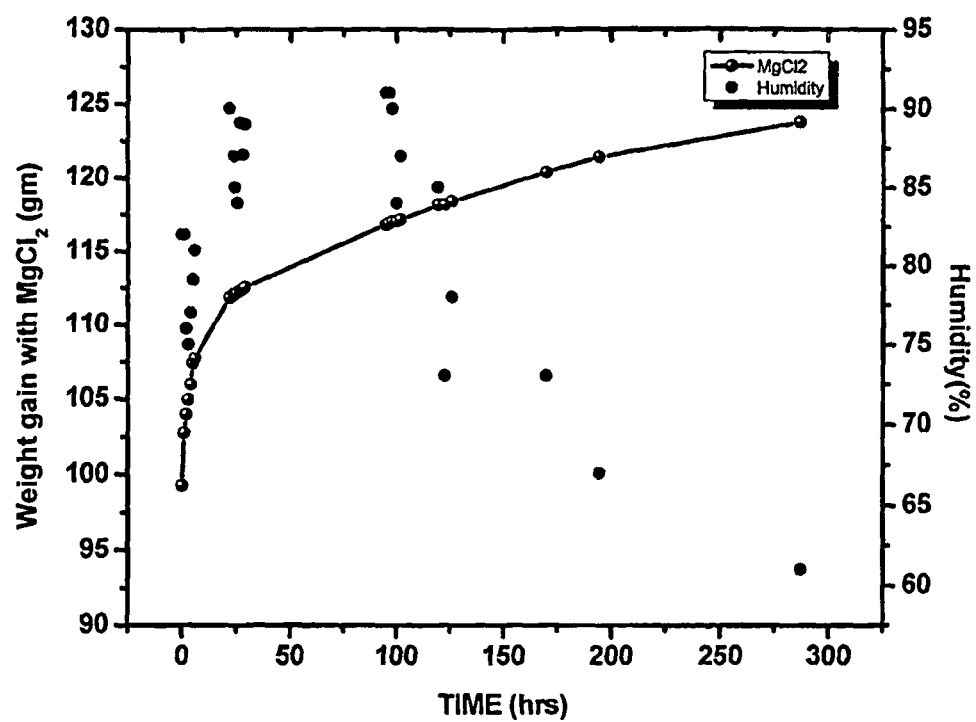
FIG. 5 depicts/illustrates a graph showing weight gain with $MgCl_2$ versus time and humidity.

FIG. 5 depicts/illustrates a graph showing weight gain with $MgCl_2$ versus time and humidity. Net moisture gained in the period of 300 hrs is 24.47 gms for 39.31 gms of salt (62%).

Figure 6:
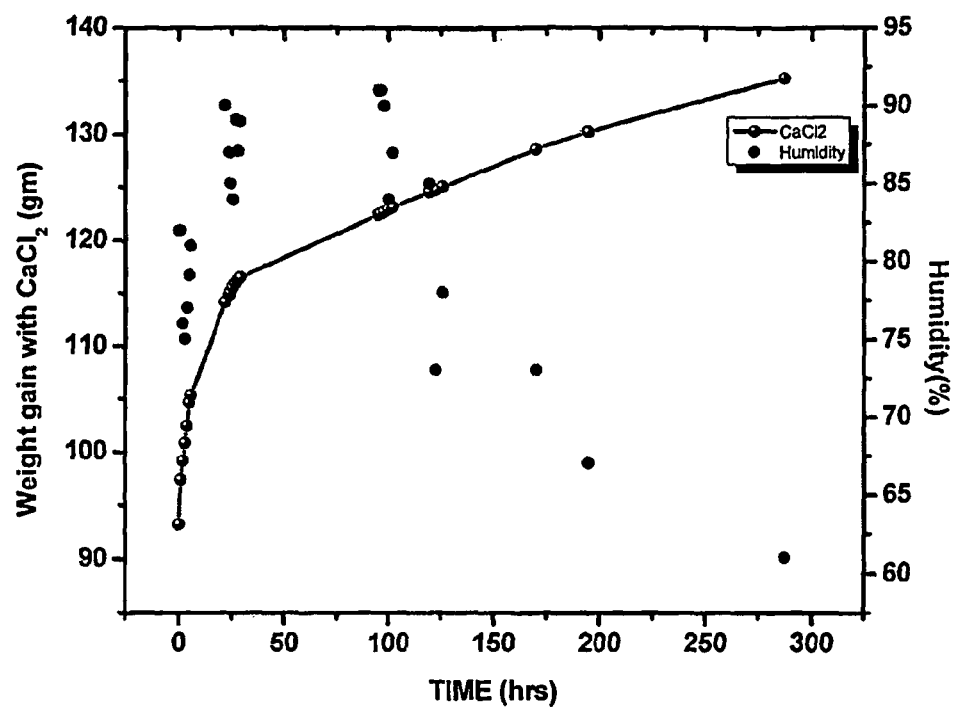
FIG. 6 depicts/illustrates a graph showing weight gain with $CaCl_2$ versus time and humidity.

FIG. 6 depicts/illustrates a graph showing weight gain with $CaCl_2$ versus time and humidity. Net moisture gained in the period of 300 hrs is 42.08 gms for 31.73 gms of salt (133%).

Figure 7:
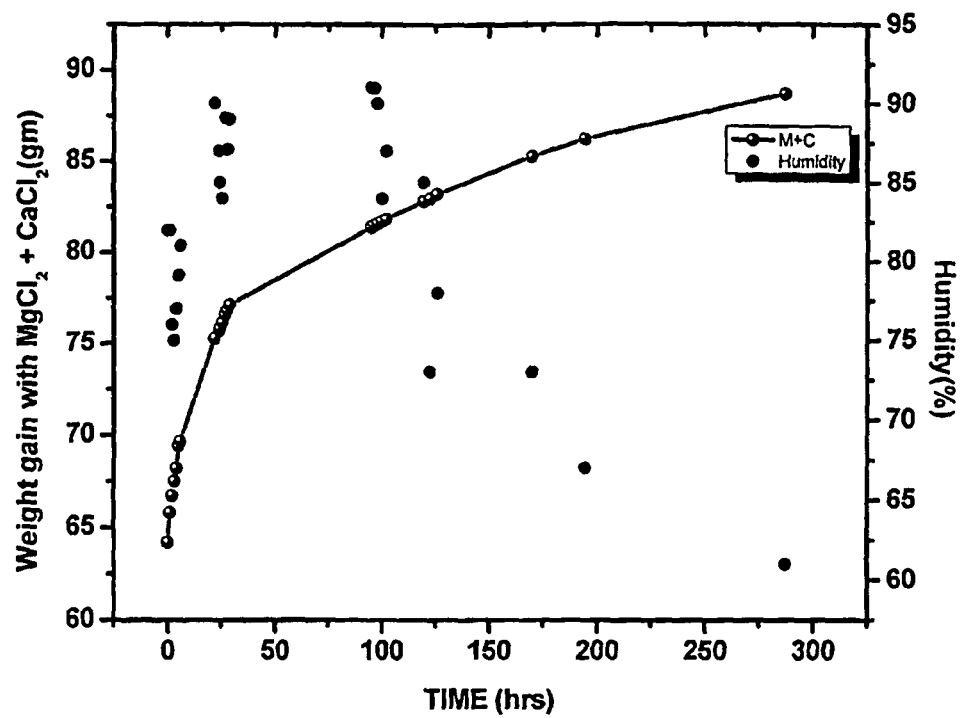
FIG. 7 depicts/illustrates a graph showing weight gain with $MgCl_2+CaCl_2$ versus time and humidity.

FIG. 7 depicts/illustrates a graph showing weight gain with $MgCl_2+CaCl_2$ versus time and humidity. Net moisture gained in the period of 100 hrs is 24.51 gms for 26.58 gms of salt (92%).

Figure 8:
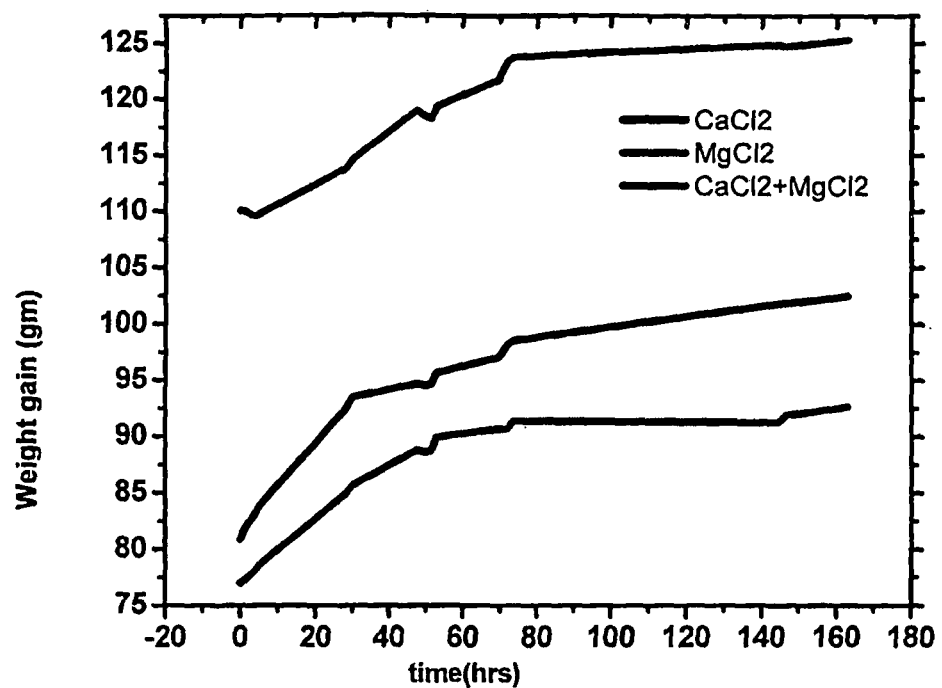
FIG. 8 depicts/illustrates a graph showing comparative weight gain of $MgCl_2$, $CaCl_2$ and $MgCl_2+CaCl_2$ versus time under extreme conditions of low humidity and high temperature.

FIG. 8 depicts/illustrates a graph showing comparative weight gain of $MgCl_2$, $CaCl_2$ and $MgCl_2+CaCl_2$ versus time. The measurements were taken at a humidity ranging from 30% to 50%, temperature around 43 degree C. for 170 hours. The weight gain was found to be 21.5 gm (~100%) for $CaCl_2$, 15 gm (~30%) for $MgCl_2$, and 16 gm (~90%) for $MgCl_2+CaCl_2$.

The foregoing description of the specific embodiments will so fully reveal the general nature of the embodiments herein that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments herein have been described in terms of preferred embodiments, those skilled in the art will recognize that the embodiments herein can be practiced with modification within the spirit and scope of the embodiments as described herein.

We claim:

1. A system for extracting water from air, said system configured to operate in a moisture absorption phase and a water extraction phase, said system comprising:
    a filter unit comprising a top covering and a base;
    a moisture absorbing unit comprising a covering made of a material with a low thermal conductivity and high reflectivity; and
    a salt plate configured to store salt, wherein said salt plate comprises a shape that corresponds to a shape of said base,
    wherein said salt plate is placed beneath said moisture absorption unit during said moisture absorption phase,
    wherein said salt plate is placed beneath said filter unit during said water extraction phase,
    wherein said filter unit is configured to extract water absorbed by said salt provided in said salt plate, and
    wherein said covering of said moisture absorbing unit is configured to facilitate water absorption by said salt placed in said salt plate during said moisture absorption phase and to protect said salt placed in said salt plate against outside contaminants.

2. The system of claim 1, wherein said moisture absorbing unit, said filter unit, and said salt plate are connected by a frame.

3. The system of claim 1, wherein the moisture absorbing unit further comprises a plurality of supports defining an opening between two supports to facilitate water absorption by said salt placed in said salt plate.

4. The system of claim 1, wherein said salt plate defines a boundary configured to receive said salt for absorbing moisture from air.

5. The system of claim 1, wherein said base is a hollow base configured to be in fluid communication with said top covering of said filter unit.

6. The system of claim 1, wherein said top covering of said filter unit defines at least one of a pyramidal, conical, and dome shape.

7. The system of claim 1, wherein said filter unit comprises a water channel.

8. The system of claim 7, wherein said water channel comprises at least one water outlet.

9. The system of claim 8, further comprising a storage unit that is in fluid communication with said water outlet.

10. The system of claim 8, further comprising:
a solar panel, wherein water stored in said storage unit cleans said solar panel;
a wiper unit comprising a hollow tube and a wiper projecting from said hollow tube, wherein said hollow tube is configured to clean said solar panel; and
a plurality of support elements configured to enable a movement of said wiper unit.

11. The system of claim 1, further comprising a water storage unit configured to receive water from said filter unit.

12. A method for extracting water from air using a system for extracting water from air, said system configured to operate in a moisture absorption phase and a water extraction phase, said system comprising a moisture absorbing unit, a filter unit, and a salt plate, said method comprising:
positioning said salt plate beneath said moisture absorbing unit during said moisture absorption phase such that a covering of said moisture absorbing unit is placed above said salt plate;
allowing salt in said salt plate to absorb water from air for a first predetermined duration;
positioning said salt plate below a base of said filter unit after said first predetermined duration such that said salt plate is in fluid communication with a top covering of said filter unit;
allowing water absorbed by said salt to evaporate in said filter unit for a second predetermined duration during said water extraction phase;
allowing said evaporated water to condense and flow through a water channel after said second predetermined duration, wherein said water channel comprises a number of openings which filters the condensed water before said condensed water is collected in a storage unit; and
collecting said condensed water flowing through said water channel in said storage unit.

13. The method of claim 12, wherein said first predetermined duration ranges from 8 to 12 hours, and wherein said second predetermined duration ranges from 10 to 12 hours.

* * * * *